United States Patent [19]

Igarashi et al.

[11] Patent Number: 5,167,865

[45] Date of Patent: Dec. 1, 1992

[54] APPARATUS AND METHOD FOR PREPARING REFORMED GAS BY MEANS OF ELECTROLESS PLATING

[75] Inventors: Akira Igarashi, Urawa; Chouji Fukuhara, Koganei; Soichi Takeshita, Kashima; Chikashi Nishino, Kashima; Masakazu Hanawa, Kashima, all of Japan

[73] Assignee: Mitsubishi Petrochemical Engineering Company Limited, Tokyo, Japan

[21] Appl. No.: 574,099

[22] Filed: Aug. 29, 1990

[30] Foreign Application Priority Data

Oct. 2, 1989 [JP] Japan .................. 1-257268

[51] Int. Cl.$^5$ ................. C07C 1/02
[52] U.S. Cl. ................. 252/313
[58] Field of Search ................. 252/373

[56] References Cited

U.S. PATENT DOCUMENTS

| | | | |
|---|---|---|---|
| 3,515,514 | 6/1970 | Holmes et al. | 23/212 |
| 4,865,624 | 9/1989 | Okada | 252/373 |

FOREIGN PATENT DOCUMENTS

| | | | |
|---|---|---|---|
| 216634 | 9/1987 | Japan | 252/373 |
| 093362 | 4/1988 | Japan | 252/373 |
| 1264902 | 4/1988 | Japan | 252/373 |

OTHER PUBLICATIONS

Kirk-Othmer Encyclopedia of Chemical Technology, vol. 8 (3rd Ed.) pp. 738-750, 1979.
U.S. Department of Energy publication US DOE/N-BN-300821.

Primary Examiner—Howard T. Mars
Assistant Examiner—Kimberly J. Kestler
Attorney, Agent, or Firm—Oblon, Spivak, McClelland, Maier & Neustadt

[57] ABSTRACT

This invention is directed to an apparatus for producing reformed gas that achieves excellent thermal conductivity as well as compactness by the deposition of catalytic components on the surface of a reforming area side of a boundary member between a heating area and a heated reforming area. The deposition is carried out under mild conditions without being restricted by the materials, construction, gaps or spaces of the reformed gas-reaction portion in the apparatus. The invention also concerns a method for producing reformed gas by using this apparatus.

12 Claims, 3 Drawing Sheets

APPARATUS AND METHOD FOR PREPARING REFORMED GAS BY MEANS OF ELECTROLESS PLATING

BACKGROUND OF THE INVENTION

1. Field of the Invention

The present invention relates to an apparatus and a method for preparing a reformed gas, more particularly to a reforming gas preparing apparatus and a method for producing a gas mixture composed of large amounts of hydrogen gas comprising hydrogen and carbon monoxide and/or carbon dioxide and/or methane from a starting gas comprising water vapor and a low-temperature liquefied gas, e.g., LNG or LPG or a hydrocarbon gas, e.g., naptha or methane, or water vapor and an alcohol such as methanol.

2. Description of the Related Art

Heretofore, various reaction apparatus, methods and apparatus for preparing a reformed gas have been proposed for the improvement of reaction results, thermal efficiency and catalyst life resulting from improved responsiveness to load fluctuation, greater compactness and more uniform temperature distribution of the reforming reactor. Although Japanese Patent Laid-open No. 62-216634, for example, discloses an invention relating to a fuel-reforming apparatus having an improved catalyst held at the reaction tube wall, there are no concrete means proposed for holding the catalyst at the wall of the reaction tube. As for a method of holding a catalyst at the wall of a reactor, for example, there is a report published by the U.S. Department of Energy DOE/NBN-300821 which proposes a method wherein powdered Raney nickel catalyst (a nickel/aluminum alloy catalyst) is deposited on a reaction tube wall surface by using a flame spray gun (a spray coating gun with flame). This method, however, is not always advantageous industrially because the applicable shape and space of the reactor are limited due to the use of a high temperature hydrogen/acetylene burner. Japanese Patent Laid-open No. 58-216742 also discloses a process where the reactor is formed by cast forming the alloy that is to be the catalyst, however, it has limitations in the degree of freedom in the construction and in the fabrication because of the honeycomb construction or laminated sheets required for keeping the reactor compact.

As for a reactor which has a wall made of a catalyst or a wall deposited with a catalyst (such reactor being referred to as a tube-wall reactor), the reactor has improved thermal conductivity between catalyst body and heating area compared with that in packed bed type of reactor in which a granular catalyst is packed or a monolithic honeycomb catalyst is stacked, nevertheless, it has problems to be solved for obtaining enough surface area of the catalyst required for the reaction. In order to obtain enough surface area of catalyst deposited on the wall of the tube-wall reactor without decreasing the thermal conductivity of the tube-wall, some means is required to increase the boundary area between the heating and the reforming areas by an alternate stacking of the reactor walls, stacking of many small tubes or stacking of partitioned honeycomb-shaped chambers. In practice, a smaller space volume of the reactor per effective catalyst surface area for the reaction is more advantageous industrially because of the resulting compactness of the reactor. As for the stacking of boundary walls having relatively small spaces formed among them, no methods have been disclosed for depositing catalyst tightly on the surface of these boundary walls under mild conditions.

SUMMARY OF THE INVENTION

Accordingly, it is an object of the present invention to provide an apparatus having excellent thermal conductivity as well as being compact in size by the deposition of catalyst components on the surface of the reforming area side of the boundary wall between the heating and the heated reforming areas under mild conditions with no restrictions caused by the materials, construction, gaps and spaces of the reformed gas-reaction portion in the apparatus for producing reformed gas and to provide a method for producing reformed gas by using this apparatus.

According to the present invention, the above object will be achieved by an apparatus for preparing reformed gas having conductive heating areas and heated reforming areas separated by gas impermeable boundary members characterized in that:

the conductive heating areas and the heated reforming areas positioned adjacent each other form mutually independent spaces separated by the gas impermeable boundary members;

the conductive heating areas have flow paths permitting a heating medium to be passed therethrough, and the heated reforming areas have flow paths for heating and reforming starting gas by using sensible heat of the heating medium through the boundary members; and a catalyst for preparing reformed gas is formed by the deposition of the catalyst components on the reforming area side surface of the gas impermeable boundary members by electroless plating.

The apparatus for producing reformed gas of the present invention advantageously carries out the production of reformed gas by increasing the heat transfer efficiency, as well as the heat utilization efficiency from the heating medium to the reaction system, by forming the catalyst for producing reformed gas through the deposition by electroless plating of catalytic components on the surface of the starting gas flow path side of the boundary walls of the starting gas flow paths positioned adjacent the heating media flow paths. The apparatus advantageously carries out the reforming reaction of the heated starting gas on the catalyst, by heating the catalyst by conduction through the boundary walls.

In the preparation of reformed gas by using the apparatus for preparing reformed gas of the present invention, the catalyst for the production of reformed gas formed by the deposition of catalyst composition on the surface of the reforming area side of the boundary members by electroless plating is heated by passing preheated heating medium through the flow paths in the conductive heating areas which form spaces separated from those of the adjacent reforming areas by the gas impermeable boundary members. The starting gas is heated and reformed by passing the starting gas through the flow paths in the heated reforming areas forming mutually independent spaces from the conductive heating areas by the gas impermeable boundary members.

DETAILED DESCRIPTION OF THE INVENTION

As for the materials of the gas impermeable boundary members used for the reformed gas production apparatus according to the present invention, tough metals having excellent heat conductivity are desired, and it is also permitted to employ non-conductive materials such as metal oxides or ceramics, in addition, porous metals such as sintered metals or porous metal oxides, or porous ceramics may be employed so that the surface area of the catalyst deposited on the one side of the boundary members may be as large as possible.

As for the materials used for the gas impermeable boundary members, taking into account the combination of the materials and the ionization tendency of the metals constituting the catalyst components to be electrolessly plated, a desired material for the reaction to be employed can be selected from the group consisting of iron, stainless steel, copper, aluminum, zinc, nickel titanium, carbon, molybdenum, cobalt and alloys thereof, or materials coated thereby.

As for the high fusing point and corrosion resistance, stainless steel is preferred, and as for heat conductivity and easy fabrication, aluminum is preferred. More preferably aluminum materials are desirable because they are easily formed into the catalyst suitable for the production of reformed gas by the deposition thereof on the surface of the gas impermeable boundary member according to electroless plating.

As for the electroless plating which is a suitable method for depositing the catalyst components on the gas impereable boundary members, there are roughly given plating methods such as displacement plating by ion exchange, thermal decomposition plating by the thermal decomposition of a metal compound and chemical reduction plating using metal ions and a reducing agent.

Displacement plating is a method wherein electrons are transferred between a plating metal and a metal to be plated (hereinafter referred to as platable material), where the plating metal becomes the ions and the platable material is the metal respectively, then the platable metal dissolves and the plating metal will deposit on the platable metal. In this case, it is necessary for the plating metal to have less of a tendency to ionize than the platable material.

Thermal decomposition plating is a method wherein a metal compound is coated on a platable material and then thermally decomposed in a reducing atmosphere to form the deposition thereof on the platable material. Method employing chlorides of nobel metals are mainly effected.

Chemical reduction plating is the so called chemical plating method, wherein metal ions in a plating solution are deposited on a platable material by the action of a reducing agent. In order to deposit a metal by this method, plating conditions are determined by the consideration of the relations among the three kinds of members, i.e., metal ions, reducing agent and platable material. The method is disclosed in detail in the literature, for example, "Latest Electroless Plating Techniques" by Sogo Gizyutsu Center K.K. published on November, 1986.

As for the plating metals, taking into account the plating conditions such as the species of metal to be plated, the pH of the plating bath and chelating agent, a suitable metal is selected from the group consisting of copper, nickel, cobalt, silver, gold, platinum, zinc, tin, lead, chromium and cadmium.

As one example, a method of electrolessly plating zinc and nickel on aluminum which is suitable material as a gas impermeable boundary member used in an apparatus for preparing reformed gas from alcohol will be described in the following.

After roughing the surface of the boundary member comprising aluminum at room temperature with an acid solution, zinc is plated according to displacement plating on the surface by filling the member with a zinc displacement plating bath comprising an aqueous solution of zinc, then after washing the surface, chemical reduction plating is conducted by the filling the member with a plating bath comprising an aqueous solution of nickel salt, reducing agent and pH buffering agent to obtain a desired catalyst.

In said plating method for aluminum, hydrochloric acid, nitric acid or sulfuric acid can be used as the acid, zinc oxide or zinc nitrate as the zinc compound, nickel chloride or nickel nitrate as the nickel compound, sodium hydrophosphite as the reducing agent, and sodium acetate as the pH buffering agent.

Preferably under the conditions of a pH of at least 7, after the deposition of zinc on the aluminum member by electroless plating, nickel is electrolessly plated thereon for the deposition of catalytic components to form the catalyst for producing the reformed gas.

The apparatus according to the present invention is an apparatus comprising at least one pair of a conductive heating area and a heated reforming area which are separated by a gas impermeable boundary member, and both areas are adjacent and made independent by the boundary member and form flow paths used for the heating medium and starting gas respectively, and catalyst components are deposited on the reforming area side surface of the boundary wall by electroless plating.

Further, a compact apparatus for preparing reformed gas having less thermal loss and high thermal conductivity can be obtained by the construction of heated reforming areas and conductive heating areas which are alternately positioned by the partition of the apparatus space into plural stages using a plurality of plates comprising gas impermeable boundary members to form a stacked construction, and then by the deposition of catalytic components on the heated reforming area side surface of the boundary walls by electroless plating.

Otherwise, a reforming apparatus can be obtained by the partition of the apparatus space into plural concentric stages using a plurality of cylindrical plates of gas impermeable boundary members to form a stacked construction; by the alternate positioning of heated reforming areas and conductive heating areas; and then by the deposition of catalytic components by electroless plating.

Alternatively, a plurality of tubular gas impermeable boundary members may be used by setting them in a vessel to form cylindrical conductive heating areas, and then applying catalytic components on the reforming area side surface of the boundary walls by electroless plating.

A reformed gas can also be produced by using said apparatus for preparing reformed gas, wherein the catalytic components, which are deposited on the walls of the heated reforming areas, are heated by conductive heating resulting from the passing of the heating medium through the conductive heating areas, and then a starting gas such as a hydrocarbon or an alcohol, or a hydrocarbon and water or an alcohol and water is allowed to pass through said heated reforming areas.

There are reforming reactions for typical hydrocarbons, for example, methane, ethane, propane and butane.

A reforming reaction for butane may be given exemplary as:

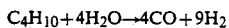
$$C_4H_{10} + 4H_2O \rightarrow 4CO + 9H_2$$

A reforming reaction for methanol as a typical alcohol may be given exemplarly as:

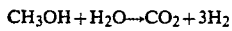
$$CH_3OH + H_2O \rightarrow CO_2 + 3H_2$$

A case wherein methanol is used alone as the starting material to be reformed to produce a reformed gas comprising carbon monoxide and hydrogen may be shown as:

$$CH_3OH \rightarrow CO + 2H_2$$

A preferred method for producing reformed gas from an alcohol which comprises,
  using an apparatus for the preparation of the reformed gas, the apparatus having reforming catalyst formed by employing aluminum as a boundary member, depositing zinc on the surface thereof by electroless plating and then electrolessly plating nickel thereon under the conditions of
  a pH of at least 7;
  providing the catalyst with activating treatment by passing hydrogen through the reforming area after heating the catalyst deposited on the wall surface in the reforming area by passing a preheated thermal medium through the conductive heating area;
  and then passing methanol or methanol and water through said heated reforming area to obtain the reformed gas.

Advantages of the present invention are as follows.

(1) Since the apparatus for preparing reformed gas of the present invention has the construction as mentioned above, the maintenance of the temperature necessary for the reforming reaction taking place on the reforming catalyst as well as the instantaneous supplementation of heat for the heat consumed by the endothermic reforming reaction are made possible by the rapid heating of the catalyst composition for producing reformed gas which is deposited on the conductive heating area side of the boundary wall by the passing of a heating medium or high temperature gas heated by a heating furnace or the like through the conductive heating area, therefore permitting the rapid follow-up of fluctuations in load. In addition, reformed gas can be advantageously produced because the reaction performance is kept at high levels resulting from keeping the temperatures at the catalyst surface relatively uniform.

(2) Further, in said apparatus for preparing reformed gas not only can the reforming catalyst be formed on-site by the deposition of the catalyst components for producing reformed gas onto the boundary wall surface by electroless plating, reducing complicated procedures such as filling catalyst in a fixed-bed reactor having granular catalyst, but it is also possible to regenerate the apparatus for preparing reformed gas when catalytic activity lowers after a certain period of operation by depositing of fresh catalytic components on the boundary wall surface by electroless plating to form the catalyst.

(3) It is possible to supply a catalyst comprising zinc, nickel and aluminum as components which are activated with hydrogen gas passed through the reforming area after heating the catalytic composition deposited on the heated reforming area by flowing a heating medium through the conductive heating area for the production of reformed gas from methanol; therefore, the development of the catalyst (or the treatment of the catalyst) by using an alkaline solution, required for a Raney type of alloy catalyst, is unnecessary.

EXAMPLES

In the following, an apparatus for preparing reformed gas according to the present invention will be explained by referring an example based on the drawings.

In addition, in an apparatus for preparing reformed gas according to the present invention, a method for producing reformed gas by passing methanol through the apparatus will be explained by referring to the following examples.

EXAMPLE 1

Figure 1:
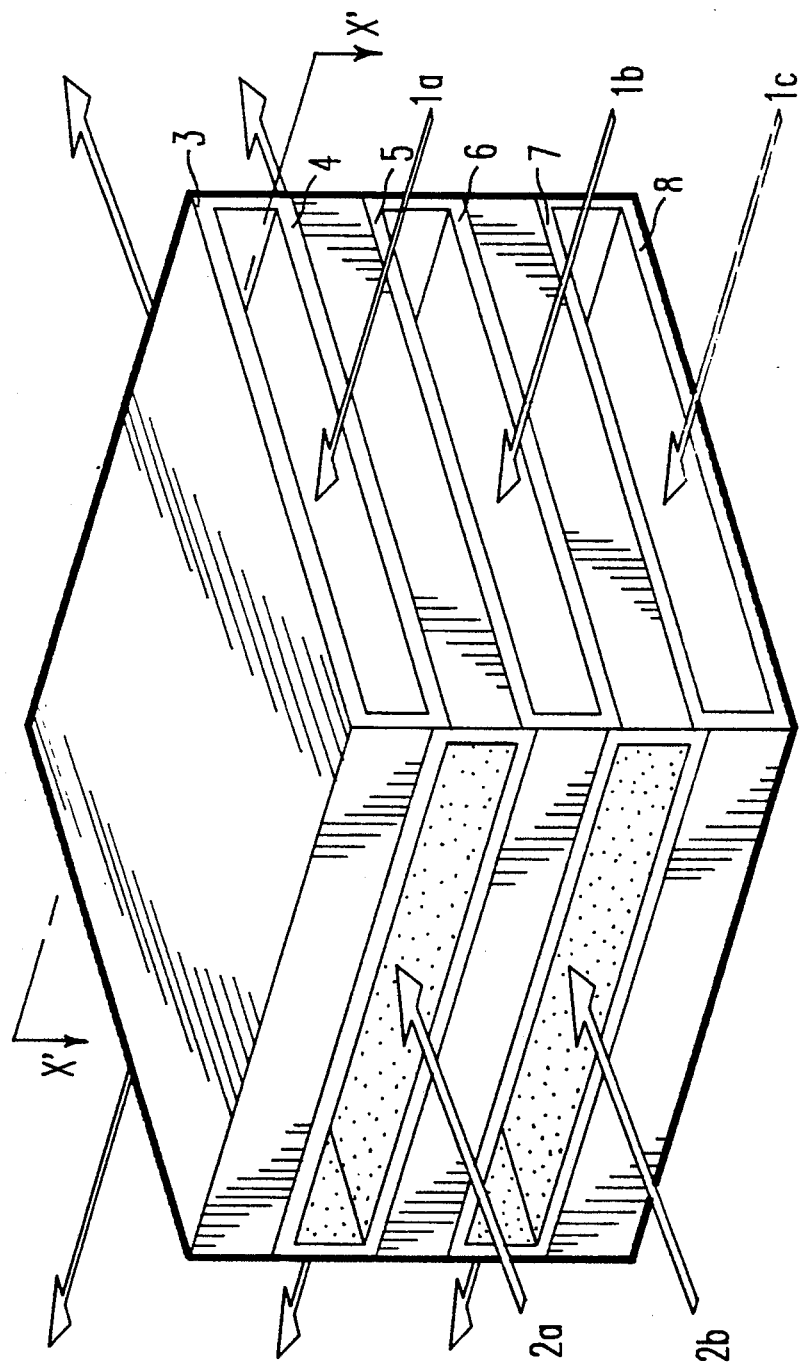
FIG. 1 is a perspective view of a reforming apparatus in an example according to the present invention.
Figure 2:
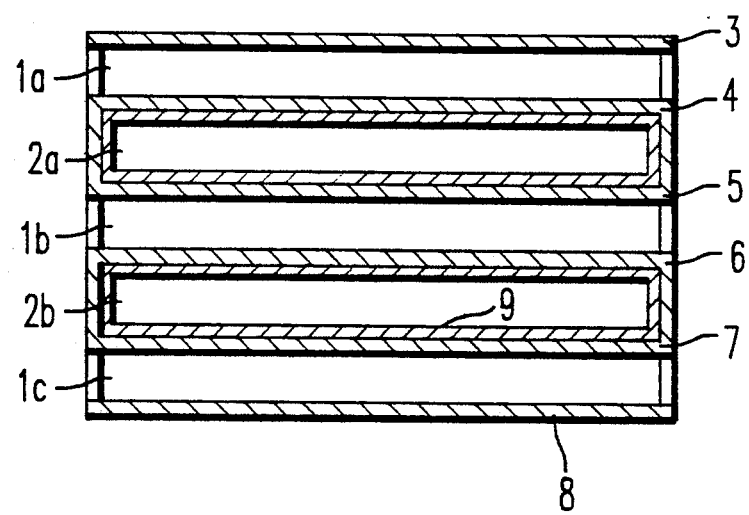
FIG. 2 is a sectional view taken along X—X' in FIG. 1.

In the reforming apparatus shown in the drawings, three conductive heating areas (flow paths 1a, 1b and 1c in FIGS. 1 and 2) and two heated reforming areas (flow paths 2a and 2b in FIGS. 1 and 2) are separated by four layered gas impermeable boundary members 4, 5, 6, and 7 in FIGS. 1 and 2 as well as the areas alternately positioned adjacently. The plates 3 and 8 in FIGS. 1 and 2, which are boundary members, are the top plate of the flow path 1a and the bottom plate of the flow path 1c respectively.

FIG. 2 shows a sectional view along the line X—X' in FIG. 1, of the apparatus.

The flow paths 1a, 1b and 1c pass through from the side face B to the side face D, and the flow paths 2a and 2b pass through from the side face A to the side face C.

The conductive heating areas (flow paths 1a, 1b and 1c) are the flow paths permitting preheated heating medium to pass through there;
  the heated reforming areas (flow paths 2a and 2b) are the flow paths where the starting materials to be reformed can pass through when a catalyst for producing reformed gas is formed on the boundary wall surface impermeable to gas by the deposition thereof by electroless plating; the starting material enters the openings of the side face A and are modified by the catalyst while flowing through the paths of the heated reforming areas, and is then exhausted from the openings of the rear side face C.

The gas impermeable boundary members of the apparatus for preparing reformed gas are made of aluminum. The aluminum members are roughened at their surface by filling the heated reforming areas (the flow paths 2a and 2b) with an acid solution comprising 200 parts by volume of 36% hydrochloric acid and 600 parts by volume of water for five minutes, then the members are filled with a zinc bath comprising 50 parts by weight of zinc oxide, 60 parts by weight of sodium hydroxide and 1000 parts by weight of pure water at 40° C. for one minute to replace the aluminum on the surface of the boundary wall with zinc, and after washing they are filled again with the zinc replacing bath for 30 seconds wished again, then filled with 70° C. of a plating bath (comprising 1000 parts by weight of pure water, 45 parts by weight of nickel chloride as a reforming catalytic component, 50 parts by weight of sodium hypophosphite as a reducing agent and 60 parts by weight of sodium acetate as a pH buffering agent, and the temperature of the bath is raised to its boiling point then maintained at the same temperature for about eight minutes till the color of the bath changes from light green to black and until the nickel is deposited, the bath then being effused and the members washed resulting in reforming catalytic components of zinc and nickel being deposited (9 in FIG. 2) to form the catalyst (nickel-zinc-aluminum catalyst) for preparing reformed gas in the heated reforming areas.

Figure 3:
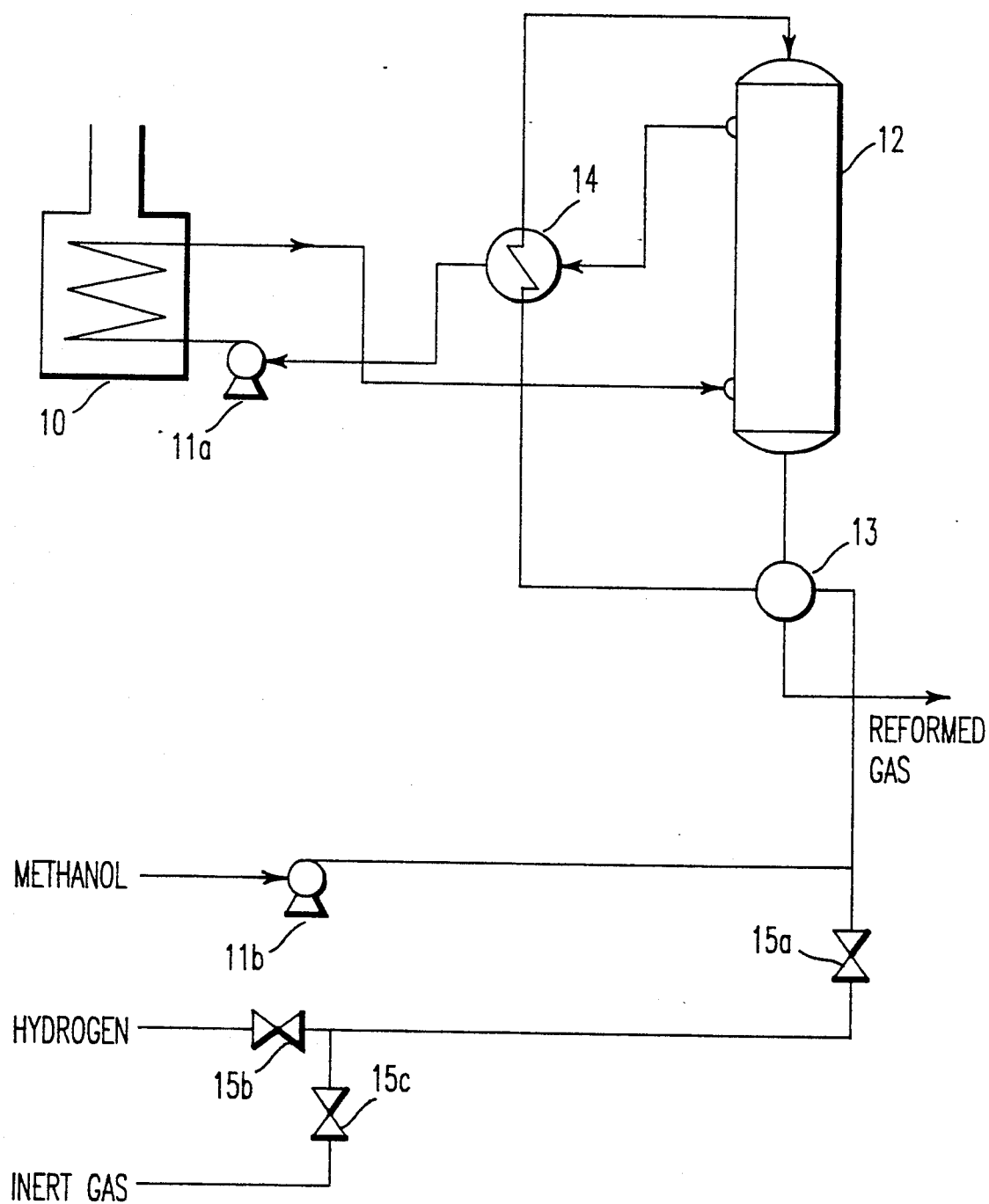
FIG. 3 is a process flow diagram containing an apparatus for preparing reformed gas.

The reduction and activation of the catalyst were conducted by raising the temperature of the apparatus for producing reformed gas (12 in FIG. 3) to 400° C. by the circulation by a pump (11a in FIG. 3) of a heating medium, which was previously heated to a specified temperature by a heating furnace (10 in FIG. 3), and by passing hydrogen gas through the flow paths of the heated reforming areas for one hour.

The temperature of the heated reforming areas were kept at a specified temperature under an inert gas flow by the passing of the heating medium through the conductive heating areas in the present apparatus for producing reformed gas, and then methanol was passed into the apparatus by a pump (11b in FIG. 3) via the starting material preheating equipment (13 in FIG. 3) and the starting material evaporating equipment (14 in FIG. 3), resulting in the production of reformed gas to obtain a gaseous mixture containing large amounts of hydrogen. Values 15a, 15b, and 15c in FIG. 3 control the flow of hydrogen and inert gas to the preheating equipment 13.

The principal reformed gas component except for hydrogen was carbon monoxide, and small amounts of methane, carbon dioxide and dimethyl ether were also obtained. Analysis of the reformed gas was conducted by gas chromatography.

The results in detail are disclosed in the following.

Performance testing conditions

Total surface area of the catalyst composition electrolessly plated: 324 cm.
Electroless plating conditions:
In the case of zinc plating: pH=12.
In the case of nickel plating: pH=7.
Flow rate of methanol: 0.472 mol/hr.
partial pressure of methanol: 0.8 atm.
Flow rate of inert gas (helium): 2.82 l/hr.
Reaction temperatures: 250 C., 300 C. and 350 C.

Primary reaction

CHOH→CO+2H

H298=21.7 kcal/mol

Definition formula

Methanol conversion rate (%)=supplied methanol (mol)-unreacted methanol (mol)

Methanol conversion rate) (%) =

$$\frac{\text{supplied methanol (mol)} - \text{unreacted methanol (mol)}}{\text{supplied methanol (mol)}} \times 100$$

Primary reaction selectivity (%) =

$$\frac{\text{yielded CO (mol)}}{\text{supplied methanol (mol)} - \text{unreacted methanol (mol)}} \times 100$$

Results

TABLE 1

| | reaction temperature (°C.) | | |
|---|---|---|---|
| | 250 | 300 | 350 |
| methanol conversion rate (%) | 59 | 91 | 100 |
| primary reaction selectivity (%) | 99 | 98 | 97 |

COMPARATIVE EXAMPLE 1

In a reforming catalyst reactor using SUS 304 members in place of the aluminum members used in EXAMPLE 1 above, an acid solution comprising 100 parts by volume of 36% hydrochloric acid and 400 parts by volume of pure water was heated to a temperature of 60° C., the reforming areas of the reactor were filled with said solution for five minutes followed by washing, a plating bath comprising 400 parts by weight of pure water, 35 parts by weight of nickel chloride, 30 parts by weight of potassium sodium tartrate as a chelating agent, 30 g of sodium hypophosphite as a reducing agent and 8 ml of formaldehyde was heated to the temperature of 60 C., and the reforming areas were then filled with said plating bath for 45 minutes followed by washing.

During this time zinc plates were contacted with the reforming reactors to form local cells, resulting in the deposition of nickel on the stainless steel as cathodes. After the activation of the catalyst with hydrogen under the same conditions as in said EXAMPLE 1, methanol was allowed to pass through the reforming reactor to obtain the results shown in TABLE-2.

TABLE 2

| | reaction temperature (°C.) | | |
|---|---|---|---|
| | 250 | 300 | 350 |
| methanol conversion rate (%) | 0.1 | 0.3 | 2.1 |
| primary reaction selectivity (%) | 97 | 92 | 95 |

COMPARATIVE EXAMPLE 2

When the boundary walls of aluminum in EXAMPLE 1 were used in an untreated condition and no zinc or nickel was plated thereon, the following results were obtained. The chief product was dimethyl ether.

TABLE 3

| | reaction temperature (°C.) | | |
|---|---|---|---|
| | 250 | 300 | 350 |
| methanol conversion rate (%) | 1 | 17 | 42 |
| primary reaction selectivity (%) | 1 | 1 | 1 |

COMPARATIVE EXAMPLE 3

When all the conditions of EXAMPLE 1 except for the pH of the zinc plating bath being altered to pH 7 by the preparation of a bath comprising 50 parts by weight of sintered zinc oxide and 1000 parts weight of pure water were applied here, the following results were obtained.

TABLE 4

| | reaction temperature (°C.) | | |
| --- | --- | --- | --- |
| | 250 | 300 | 350 |
| methanol conversion rate (%) | 33 | 77 | 99 |
| primary reaction selectivity (%) | 96 | 95 | 95 |

COMPARATIVE EXAMPLE 4

When all the conditions of EXAMPLE 1 except for the pH of the zinc plating bath being altered to an acidic side of pH 5.3 by the preparation of a bath comprising 80 parts by weight of zinc nitrate and 1000 parts by weight of pure water were applied here, the following results were obtained.

TABLE 5

| | reaction temperature (°C.) | | |
| --- | --- | --- | --- |
| | 250 | 300 | 350 |
| methanol conversion rate (%) | 8 | 39 | 57 |
| primary reaction selectivity (%) | 97 | 92 | 87 |

COMPARATIVE EXAMPLE 5

When all the conditions of EXAMPLE 1 except for the pH of the nickel plating bath being altered to an acidic side of pH 6.6 by changing the amount of sodium acetate in the bath were applied here, the following results were obtained.

TABLE 6

| | reaction temperature (°C.) | | |
| --- | --- | --- | --- |
| | 250 | 300 | 350 |
| methanol conversion rate (%) | 1 | 5 | 9 |
| primary reaction selectivity (%) | 95 | 90 | 63 |

COMPARATIVE EXAMPLE 6

A reaction of producing reformed gas was conducted by using a conventional fixed bed flow reactor in place of the apparatus for producing reformed gas used in said Example 1.

Except for packing a catalyst prepared by the plating of zinc and nickel on an aluminum plate section having the same surface area as that of the heated reforming areas in EXAMPLE 1 in a fixed bed flow reactor made of tubular stainless steel, all the conditions applied here were similar to those in EXAMPLE 1 to obtain the following results.

TABLE 7

| | reaction temperature (°C.) | | |
| --- | --- | --- | --- |
| | 250 | 300 | 350 |
| methanol conversion rate (%) | 24 | 82 | 100 |
| primary reaction selectivity (%) | 98 | 97 | 96 |

What is claimed is:

1. A method for preparing reformed gas, comprising:
    depositing a catalyst on surfaces of reforming areas which form gas impermeable boundary members with conductive heating areas, by electroless plating;
    heating a heating medium, then;
    flowing the heating medium through flow paths of the conductive heating areas, said conductive heating areas forming spaces which are separated from adjacent reforming areas by the gas impermeable boundary members, thereby heating the deposited catalyst and
    flowing gas to be reformed, which comprises hydrocarbons, alcohols, a hydrocarbon and water, or alcohol and water through the heated reforming areas, thereby producing a reformed gas.
2. A method for preparing reformed gas, according to claim 1, wherein:
    the gas impermeable boundary layer includes an aluminum layer; and
    said depositing a catalyst by electroless plating comprises depositing zinc and nickel while maintaining a PH of at least 7, and conductively heating the catalyst by passing heated heating medium through the heating areas while passing hydrogen through the heated reforming areas.
3. A method according to claim 1, wherein:
    said gas to be reformed comprises steam.
4. A method according to claim 1, wherein:
    said gas to be reformed comprises at least one of methanol, and methanol and steam.
5. A method according to claim 1, wherein:
    said gas to be reformed is a member selected from the group essentially consisting of methanol, and methanol and steam.
6. A method according to claim 1, wherein:
    the reformed gas comprises hydrogen and at least one of carbon monoxide and carbon dioxide.
7. A method according to claim 3, wherein:
    the reformed gas comprises hydrogen and at least one of carbon monoxide and carbon dioxide.
8. A method according to claim 1, wherein:
    the heating medium is a high temperature gas.
9. A method according to claim 1, wherein:
    said catalyst is selected from members of the group consisting of Al, Cu, Ni, Co, Ag, Au, Pt, Zn, Sn, Pb, Cr, and Cd.
10. A method according to claim 1, wherein:
    said catalyst components are selected from members of the group consisting of Al, Ni and Zn.
11. A method according to claim 1, further comprising the step of:
    roughening the surfaces of the reforming areas by acid etching.
12. A method for preparing reformed gas, comprising:
    depositing a catalyst of Zn, Ni and Al on surfaces of reforming areas, which form gas impermeable boundary members with conductive heating areas, by electroless plating of Zn and Ni on an aluminum surface of the boundary members;
    heating a heating medium of high temperature gas; then
    flowing the high temperature gas through flow paths of the conductive heating areas, said conductive heating areas forming spaces which are separated from adjacent reforming areas by the gas impermeable boundary members, thereby heating the deposited catalyst; and
    flowing a hydrocarbon gas or a hydrocarbon gas and steam through the reforming areas, thereby producing a reformed gas containing hydrogen and at least one of carbon dioxide and carbon monoxide.

* * * * *